United States Patent [19]
Brill et al.

[11] Patent Number: 5,719,966
[45] Date of Patent: Feb. 17, 1998

[54] APPARATUS FOR ASSESSING THE VISIBLITY OF DIFFERENCES BETWEEN TWO IMAGE SEQUENCES

[75] Inventors: Michael Henry Brill, Morrisville, Pa.; Gooitzen Siemen van der Wal, Hopewell; Jeffrey Lubin, South Orange, both of N.J.

[73] Assignee: David Sarnoff Research Center, Inc., Princeton, N.J.

[21] Appl. No.: 730,275

[22] Filed: Oct. 15, 1996

Related U.S. Application Data

[60] Provisional application No. 60/014,436, Mar. 29, 1996.
[51] Int. Cl.[6] .................. G06T 5/00; G06T 7/00
[52] U.S. Cl. .......... 382/260; 382/263; 382/264; 382/274; 382/302
[58] Field of Search .................. 382/260, 264, 382/302, 263, 254, 274, 275, 276, 279, 303, 304, 240

[56] References Cited

U.S. PATENT DOCUMENTS 4,674,125  6/1987  Carlson et al. .................. 382/264
4,718,104  1/1988  Anderson .................. 382/264
5,359,674  10/1994  van der Wal .................. 382/240

OTHER PUBLICATIONS

Gooitzen S. Van Der Wal and Peter J. Burt, "A VLSI Pyramid Chip for Multiresolution Image Analysis", International Journal of Computer Vision, 8:3, 177–189 (1992).

Burt, P. J., The Laplacian Pyramid as a Compact Image Code, IEEE Transactions on Communications, vol. COM-31, No. 4, pp. 532–540.

*Primary Examiner*—Scott A. Rogers
*Attorney, Agent, or Firm*—William J. Burke

[57] ABSTRACT

An apparatus for assessing the visibility of differences between two input image sequences. The apparatus comprises a pair of pre-filtered processors, a pair of pyramid constructors and a JND processor. Each pre-filter processor receives a separate input image sequence and performs temporal filtering to produce a low-pass temporal response and a bandpass temporal response. In turn, the pyramid constructors receive the temporal responses and generate contrast pyramids for the temporal responses. The JND processor evaluates the contrast pyramids to produce an image metric which is used to assess the visibility of differences between the two input image sequences.

14 Claims, 7 Drawing Sheets

APPARATUS FOR ASSESSING THE VISIBLITY OF DIFFERENCES BETWEEN TWO IMAGE SEQUENCES

This application claims the benefit of U.S. Provisional Application Ser. No. 60/014,436, filed Mar. 29, 1996.

The present invention relates to an apparatus for evaluating and improving the performance of imaging systems. More particularly, this invention relates to an apparatus that assesses the visibility of differences between two image sequences.

BACKGROUND OF THE INVENTION

Designers of imaging systems often assess the performance of their designs in terms of physical parameters such as contrast, resolution and bit-rate efficiency in compression/decompression (codec) processes. While these parameters can be easily measured, they may not be accurate gauges for evaluating performance. The reason is that end users of imaging systems are generally more concerned with the subjective visual performance such as the visibility of artifacts or distortions and in some cases, the enhancement of these image features which may reveal information such as the existence of a tumor in an image, e.g., a MRI (Magnetic Resonance Imaging) image or a CAT (Computer-Assisted Tomography) scan image.

For example, an input image can be processed using two different codec algorithms to produce two different codec images. If the measure of codec image fidelity is based purely on operations such as performing mean squared error (MSE) calculations on both codec images without considering the psychophysical properties of human vision, the codec image with a lower MSE value may actually contain more noticeable distortions than that of a codec image with a higher MSE value.

Over the years, various human visual performance models were used to improve imaging system design. One model (known as the Carlson and Cohen model) decomposes an input image by partitioning its one-dimensional power spectrum into a number of discrete adjacent frequency bands. The integral of the amplitude values within each band is then subjected to a static non-linearity that is accelerating for small input values and compressive for large values. Changes in the output of this process from one member of a pair of images to the other provide a simple perceptual measure of the visibility of differences between the two images.

A similar method is the square root integral model (SQRI). In this model, the separate frequency-selective bands are replaced by a single integral over spatial frequencies, based on the ratio between the modulation transfer function of the display and an arithmetic approximation to the contrast sensitivity function of the human observer. Although the SQRI has been successfully applied to a number of different display evaluation problems, this model and other basic psychophysics models are spatially one-dimensional. Namely, these models predict sensitivity to spatial variation in one dimension only.

Therefore, a need exists in the art for an apparatus for assessing the effects of physical parameters on the subjective visual performance of an imaging system. Specifically, a need exists for an apparatus for assessing the visibility of differences between two sequences of time-varying visual images.

SUMMARY OF THE INVENTION

The present invention is an apparatus for assessing the visibility of differences between two input image sequences. The apparatus comprises a pair of pre-filtered processors, a pair of pyramid constructors and a "just-noticeable-differences" (JND) processor.

Each pre-filter processor receives a separate input image sequence and performs temporal filtering to produce a low-pass (sustained channel) temporal response and a band-pass (transient channel) temporal response. In turn, the pyramid constructors receive the temporal responses and generate contrast pyramids for the temporal responses. Namely, the pyramid constructor generates and manipulates Gaussian and Laplacian pyramids for each image in the temporal responses. Finally, the outputs from the pyramid constructors are received and evaluated by the JND processor to produce an image metric which is used to assess the visibility of differences between the two input image sequences.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
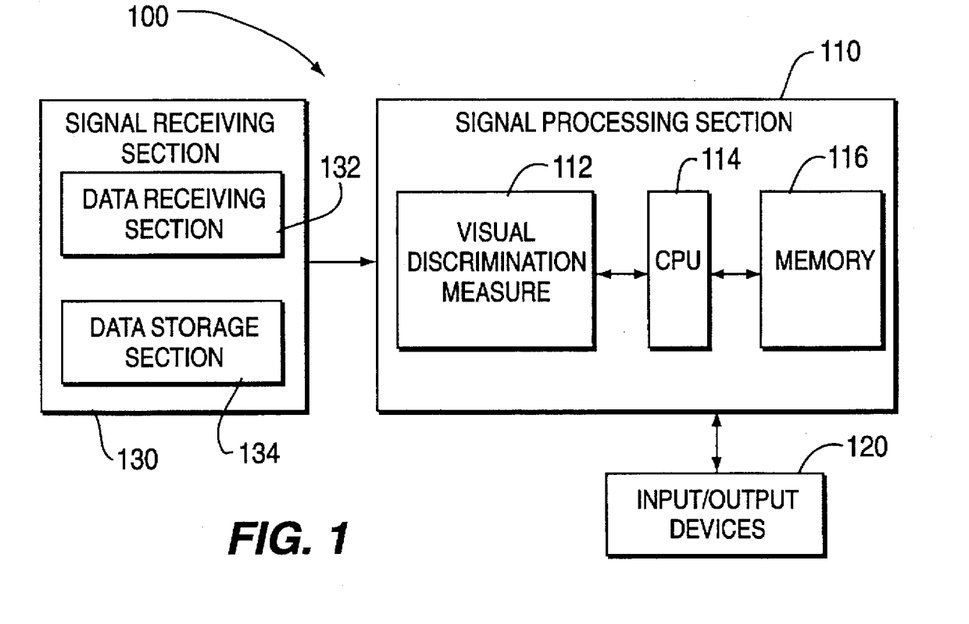
FIG. 1 illustrates a block diagram of a signal processing system of the present invention.

FIG. 1 depicts a signal processing system 100 that utilizes the present invention. The signal processing system consists of a signal receiving section 130, a signal processing section 110 and input/output devices 120.

Signal receiving section 130 serves to receive input data signals, such as sequences of images (or frames) from imaging devices. Signal receiving section 130 includes a data receiving section 132 and a data storage section 134. Data receiving section 130 may include a number of devices such as a modem and an analog-to-digital converter. A modem is a well-known device that comprises a modulator and a demodulator for sending and receiving binary data over a telephone line or other communication channel, while an analog-to-digital converter converts analog signals into a digital form. Hence, signal receiving section 130 may receive input signals "on-line" or in "real-time" and, if necessary, convert them to a digital form. As such, section 130 may receive signals from one or more devices such as a computer, a camera, a video recorder or various medical imaging devices.

The data storage section 134 serves to store input signals received by data receiving section 132. Data storage section 134 contains one or more storage devices such as a disk drive, semiconductor memory or other storage media. These storage devices provide a method for applying a delay to the input signals or to simply store the input signals for subsequent processing.

In the preferred embodiment, the signal processing section 110 comprises a general purpose computer having a visual discrimination measure 112, a central processing unit (CPU) 114 and a memory 116 to facilitate image processing. The visual discrimination measure 112, coupled to the CPU through a communication channel, is constructed from various filters. Alternatively, the visual discrimination measure 112 can be implemented as a software application residing in the memory 116 of the signal processing section.

The signal processing section 110 is also coupled to a plurality of input and output devices 120 such as a keyboard, a mouse, a video monitor or storage devices including but not limited to a hard disk drive or a compact disk drive. The input devices serve to provide inputs (data and/or control signals) to the signal processing section for processing the input images, while the output devices serve to display or record the results.

The visual discrimination measure 112 assesses the visibility of differences between two sequences or streams of input images and generates an objective "just-noticeable difference" (JND) image metric. This metric can be expressed as a JND value, a JND map for each pair of input images or a probability prediction. In turn, the CPU may utilize the JND image metric to optimize various processes including, but not limited to, digital image compression, image quality measurement and target detection.

Figure 2:
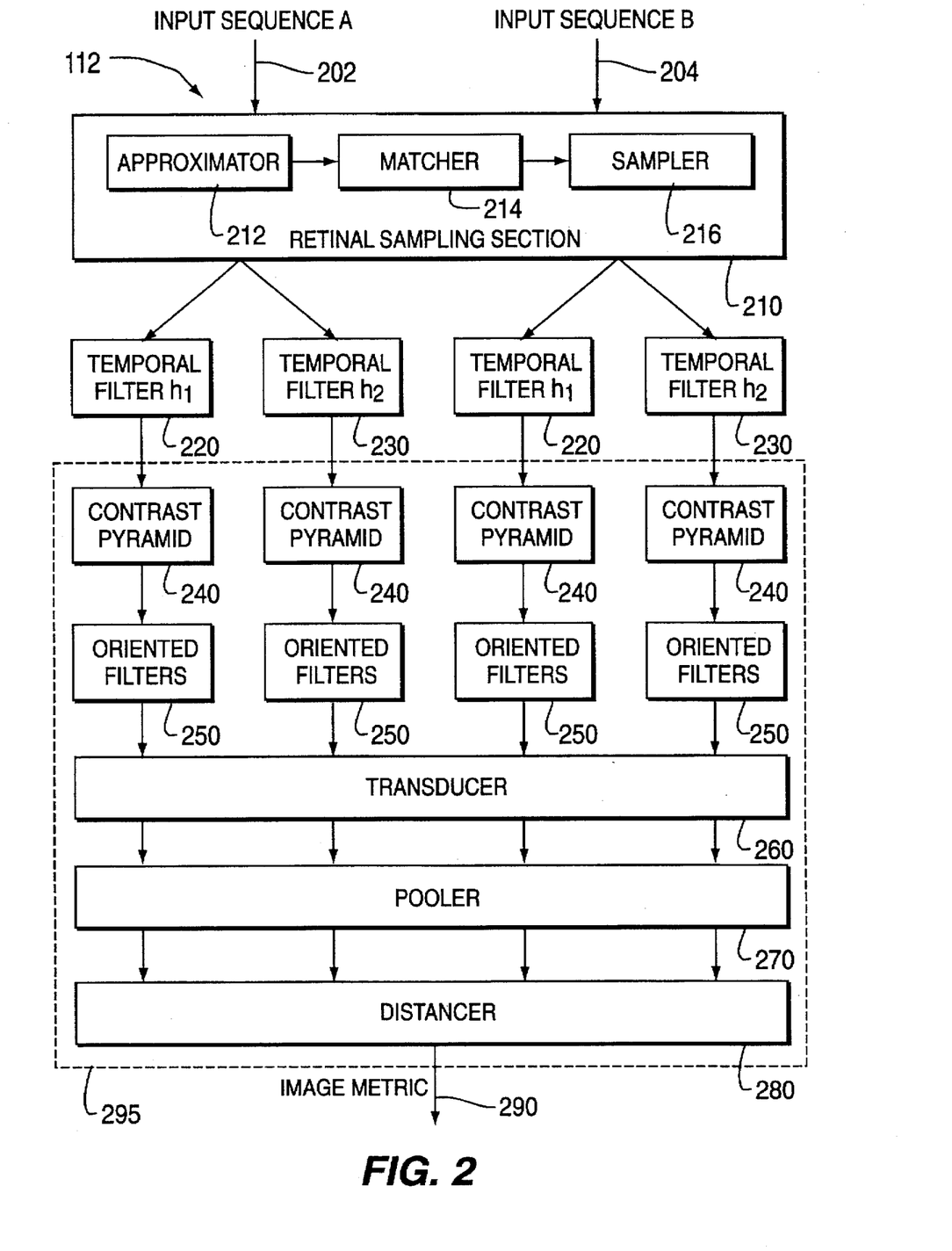
FIG. 2 illustrates a block diagram of the structure of the visual discrimination measure.

FIG. 2 depicts a block diagram of the structure of the visual discrimination measure 112. The visual discrimination measure comprises a retinal sampling section 210, a plurality of temporal filters 220 and 230, and a spatial discrimination section 295. The spatial discrimination section (spatial discriminator) comprises a plurality of contrast pyramid filters 240, a plurality of optional oriented filters 250, a transducer section 260, a pooling section 270 and a distance section 280.

The retinal sampling section (retinal sampler) 210 receives and processes a plurality of stimuli to produce retinal sampled image sequences. Namely, the retinal sampling section resamples the stimuli to simulate the sampling process of a human eye. The retinal sampling section 210 comprises an approximator 212, a matcher 214 and a sampler 216.

In the preferred embodiment, the stimuli are two digitized sequences of images, input sequence A 202 and input sequence B 204. The input sequences represent time frames of sampled luminance distributions on a planar surface, i.e., as would be returned from a photometer sampling from a uniform grid of closely spaced points on the surface of a display device. For example, sequence A may comprise original images (e.g., a reference image sequence) while sequence B may comprise codec processed images of sequence A (e.g., a test image sequence). The input images are convolved by the approximator 212 with a function approximating the point spread produced by the optics of the eye. This function is expressed as:

$$Q(\rho)=0.952 \exp(-2.59|\rho|^{1.36})+0.048 \exp(-2.43|\rho|^{1.74}) \quad (1)$$

where $\rho$ is distance in minutes of arc (expressed in visual angle) from a point of light (measured in the plane of the image, whose normal is assumed to be the principal ray of the eye's optics), and $Q(\rho)$ is the intensity of light at a distance $\rho$, relative to the maximum. This function is disclosed by G. Westheimer in "The Eye As An Optical Instrument" in *Handbook of Perception and Human Performance* (1986).

The retinal sampling section 210 may also receive as input, a number of optional parameters relating to illuminance in the ambient environment, the physical size of the input images and the observer's fixation state. More specifically, these parameters include the physical distance between sample points on the input images (in mm), the frame rate (in Hz), the distance of the modeled observer from the image plane (in mm), the fixation depth (in mm defaulted to the viewing distance) and the eccentricity of the images in the observer's visual field (in degrees, defaulted to zero). These parameters are generally set with reasonable default values unless otherwise specified.

The retinal sampling section 210 further comprises an optional matcher 214 for performing an optional operation on the input images if the fixation depth does not match the image depth. Image depth is the actual distance from the focal center of the eye to the image. Fixation depth is the distance at which the observer is fixating his/her eyes when viewing the image. Thus, if an image depth is set at a distance of 30 inches, then a viewer looking at the same image at a distance (fixation depth) of 60 inches, may perceive the image with a slight blur. Thus, in order to account for changes in effective image resolution with changes in the difference between image depth and fixation depth, geometrical optics are used to calculate the size of the blur circle, i.e., default diameter of the blur circle is zero. Calculation of blur circle radius is as follows: if fixation depth is $D_F$, viewing distance to the screen is D, the depth of the retina from the pupil is $D_i$ and pupil diameter is d, then the blur circle radius r is given by d/2 times the absolute value of $(D_i-D_i')$ divided by $D_i$. The parameter $D_i'$ is the distance of the retina from the pupil that would render the screen completely in focus, where $D_i'$ is given by the thin-lens formula $(1/D_i'=1/D_i+1/D_F-1/D)$. This calculation requires knowledge of the distance $D_i$ from the pupil to the imaging surface (i.e., the retina), taken as 20.3 mm from Westheimer (1986). The calculation also requires an estimate of pupil size, which is derived from the pupil diameter prediction method as described in U.S. provisional patent application, Ser. No. 60/014,274 filed Mar. 29, 1996, now U.S. patent application Ser. No. 08/693,725 filed Aug. 7, 1996 (Attorney Docket 12138) incorporated herein by reference.

The area of densest photoreceptor sampling on the retina is the fovea, covering approximately the central two (2) degrees around the point of fixation. In this region, the linear photoreceptor density is approximately 120 retinal cones per degree. A retinal cone is a specific type of receptor in the retina. To simulate this sampling process of the human eye, the retinal sampling section 210 incorporates a sampler 216 to apply Gaussian convolution and point sampling sequence of operations. Namely, the input image is sampled at a density of 120 pixels per degree of visual angle to generate a "retinal image" of 512×512 pixels for "foveal viewing".

The linear density of photoreceptors declines as a roughly linear function of eccentricity. To simulate this effect, the sampler 216 is applied, where the sampling density for "non-foveal viewing" is calculated from the expression:

$$d = \frac{120}{1 + ke} \quad (2)$$

where d is the calculated density, e is the eccentricity in degrees, and k is a parameter set at 0.4, where the value is estimated from psychophysical data disclosed by A. Watson in "Detection And Recognition Of Simple Spatial Forms", in *Physical and Biological Processing of Images* (1983). Effectively, the output images from the retinal sampling section simulate those images that are generated from a human retina when viewing the input sequences A and B.

Next, the visual discrimination measure 112 incorporates a plurality of temporal filters 220 and 230 to separate each input sequence of images into two different channels. Two temporal filters, labeled $h_1$ 220 and $h_2$ 230 in FIG. 2, are used to separate each input sequence into a low-pass (sustained channel) temporal response and a bandpass (transient channel) temporal response. Other temporal filters with different analytic forms can be employed with the condition that the basic low-pass and bandpass shapes are maintained. In the preferred embodiment, the low-pass temporal and bandpass temporal filters can be expressed respectively as:

$$h_1(t) = \lambda e^{-\lambda t} u(t) \quad (3)$$

$$h_2(t) = \mu(\mu t)^n \left[ \frac{1}{n!} - \frac{(\mu t)^2}{(n+2)!} \right] e^{-\mu t} u(t) \quad (4)$$

where u(t) is the unit step function, μ is a positive real value which defaults to 84.14 Hz, λ defaults to 5.2 Hz and n defaults to an integer set at 3 or 5 (preferred value is 3). The filter $h_2(t)$ is disclosed by Adelson and Bergen, *J. Opt. Soc. Am. A* 2, 291 (1985). Alternatively, the bandpass filter 230 as defined in Equation 4 above, can be implemented by taking a difference of two low-pass filters.

Effectively, the sustained channel temporally blurs the input stream, but provides relatively good spatial resolution. Thus, the output of this channel is ideal for looking at fine details in the image sequence. Conversely, the transient channel spatially blurs the input stream, but provides good temporal resolution which is ideal to detect motion in the input sequence. As illustrated in FIG. 2, each of the two input sequence outputs from the retinal sampling section forms an input to each of the two temporal filters 220 and 230, to generate four image streams for input to the contrast pyramid transforms 240.

After the temporal filtering, each of the resulting raw luminance signals from the temporal filters is received and converted by a contrast transform 240 to units of local contrast. Namely, a "contrast pyramid" is generated by decomposing the 512×512 retinal image into Gaussian and Laplacian pyramids. First, each image is decomposed into a Laplacian pyramid as disclosed by P. J. Burt and E. H. Adelson in "The Laplacian Pyramid As A Compact Image Code", *IEEE Transactions on Communications* (1983). In the preferred embodiment, the image is decomposed into a set of seven (7) frequency channels or bandpass (pyramid) levels with peak frequencies ranging from 32 through 0.5 cycles/degree. Each level is separated from its neighbors by one octave, i.e., 32, 16, 8, 4, 2, 1 and 0.5. Then, at each point in each level, the Laplacian value is divided by the corresponding point upsampled from the Gaussian pyramid level two levels down in resolution. Namely, to compute the local contrast at each level of the pyramid, a Laplacian (bandpass) pyramid is generated by subtracting from each Gaussian level a one-level-blurred copy of itself; the result is divided by a two-level-blurred copy. Mathematically, this contrast pyramid operation can be expressed (in the continuous domain) as:

$$\hat{c}_k(\vec{x}) = \frac{I(\vec{x}) * (G_k(\vec{x}) - G_{k+1}(\vec{x}))}{I(\vec{x}) * G_{k+2}(\vec{x})} \quad (5)$$

where $\hat{c}_k(\vec{x})$ is the contrast at pyramid level k, (time t is suppressed), $\vec{x}$ is a two-dimensional position vector, $I(\vec{x})$ is the input image from the temporal filter, and where $G_k(\vec{x})$ is a Gaussian convolution kernel expressed as:

$$G_k(\vec{x}) = \frac{1}{(\sqrt{2\pi}\ \sigma_k)^2} e^{-(x^2+y^2)/2\sigma_k^2} \quad (6)$$

for which $\sigma_k = 2^{k-1}\sigma_0$, where $\sigma_0$ is the distance between adjacent foveal photoreceptors, measured in the same unit as in x and y. The result of this contrast pyramid operation is a local difference divided by a local mean, i.e., a local measure of contrast, localized in both space and frequency. Namely, the result is a measure of the magnitude of local change divided by the local mean for a number of different scales separated from each other by one octave. For a sine grating within the frequency passband of one pyramid level, the resulting contrast measure is approximately equivalent to the Weber contrast, i.e., $(L_{max} - L_{min})/L_{mean}$, where $L_{max}$, $L_{min}$, and $L_{mean}$ refer respectively to the maximum, minimum, and mean luminance of the grating pattern. This contrast pyramid operation is applied identically to values coming from both temporal filtering channels. A similar process for implementing the contrast pyramid calculation is disclosed by E. Peli in "Contrast In Complex Images", *J. Opt. Soc. Am.* (1990). Furthermore, although the preferred embodiment incorporates a contrast pyramid having seven levels, the present invention can be modified by using contrast pyramids with any number of levels and/or other peak frequency ranges.

Since the complexity of spatial filtering may vary with the speed vs. accuracy requirements of a particular application, the square of each contrast pyramid output pixel is generally normalized by the value $1/H_{kn}$, which is close to the squared grating contrast detection threshold for that temporal channel, pyramid level and local luminance. Denoting the pyramid level by k (k=1, . . . 7 from finest to coarsest resolution), and the temporal channels by n (n=1, 2) sustained and transient channels respectively, then $H_{k1}$ are given the following default values: (12.48, 3.197, 361.8, 396.3, 227.2, 4.573, 5.573), $H_{k2}$ are given as (2.02, 57.36, 202.58, 324.39, 483.09, 608.39, 597.50). These values effectively cause the transient channel to have a coarse spatial resolution, and vice versa. The values, determined by calibration described below, are generally functions of average retinal illumination B, but default to values corresponding to B=200 trolands. Two options are considered here:

(1) if orientation tuning is not chosen, then normalized outputs $\hat{e}_{k,n}(\vec{x},t)$ are computed as:

$$\hat{e}_{k,n}(\vec{x},t) = H_{kn}(\hat{c}_{k,n}(\vec{x},t))^2 \quad (7)$$

(2) if orientation tuning or filtering is chosen, then each level of the contrast pyramid is received and convolved with a set of four (4) pairs of spatially oriented filters 250 to produce a spatially oriented output.

Figure 6:
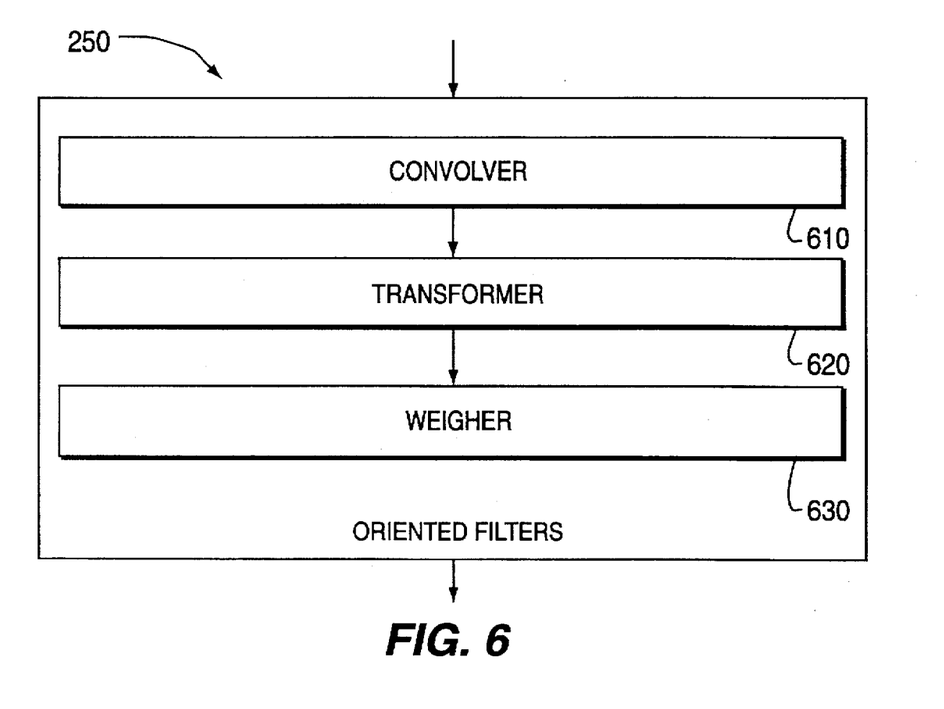
FIG. 6 illustrates a block diagram of oriented filters of the present invention.

FIG. 6 illustrates a block diagram of the oriented filters 250 which comprises a convolver 610, a transformer 620 and a weigher 630. The convolver 610 comprises a plurality of spatially oriented filter pairs, where each pair of filters consists of a directional second derivative of a Gaussian (in one of the four directions horizontal, vertical and the two diagonals) and its Hilbert transform. These filters contain a log bandwidth at half height of approximately 0.7 octaves, a value within the range of bandwidths inferred psychophysically by A. Watson in "Summation Of Grating Patches Indicates Many Types Of Detectors At One Retina Location", *Vision Res.* 22 (1982). In the preferred embodiment, the orientation bandwidth of these filters (i.e., the range of angles over which filter output is greater than one half the maximum) is approximately 65 degrees. This figure is slightly larger than the 40 degree tuning of monkey simple cells reported by DeValois et al. in "The Orientation And Direction Selectivity Of Cells In Macaque Visual Cortex", *Vision Res.* 22 (1982) 531–544, and the 30 to 60 degree range reported psychophysically by Phillips and Wilson in "Orientation Bandwidths Of Spatial Mechanisms Measured By Masking", *J. Opt. Soc. Am.* [A] 1 (1984) 226–232.

Alternatively, spatially oriented filters with smaller bandwidths can be employed, but additional filters will be required to uniformly cover the range of orientations, which leads to a computationally expensive, slower, but more accurate process. Thus, although prediction accuracy on some orientation masking data may be degraded, employing filters having four (4) orientations provides a good balance between performance and cost. However, those skilled in the art will realize that the number of filters in the present invention can be adjusted to tailor to the requirements of a specific application. In the present invention, the spatially oriented filters are implemented by using the steerable filters of W. T. Freeman and E. H. Adelson in "The Design And Use Of Steerable Filters", *IEEE Transactions on Pattern Analysis and Machine Intelligence* 13 (1991) 891–906.

After oriented filtering, the corresponding Hilbert pairs of filter output images are squared and summed by the transformer 620, resulting in a phase-independent energy response:

$$e_{k,n,\theta}(\vec{x}_r,t) = (o_{k,n,\theta}(\vec{x},t))^2 + (h_{k,n,\theta}(\vec{x}_r,t))^2 \quad (8)$$

where θ indexes over the 4 orientations, n indexes over the two temporal channels, k is pyramid level, and o and h are the oriented operator and its Hilbert transform. This operation simulates a widely proposed transformation in the mammalian visual cortex from a linear response among simple cells to an energy response among complex cells. The phase independence resulting from this operation provides some useful properties, e.g., it causes the visual discrimination measure 112 to be less sensitive to the exact position of an edge, a property exhibited in human psychophysical performance.

Next, each energy response or measure is received and normalized by $H_{kn}$ of the weigher 630 as discussed above for equation (7). The result is a set of values $\hat{e}_{k,n}(\vec{x},t)$ with an additional index θ for each orientation channel which is expressed as:

$$\hat{e}_{k,n,\theta}(\vec{x},t) = H_{kn} e_{k,n,\theta}(\vec{x},t) \quad (9)$$

This ends orientation tuning option (2).

Thus, if option (1) is selected, the oriented filters 250 as illustrated in FIG. 2 are replaced by a weigher for producing normalized outputs $\hat{e}_{k,n}(\vec{x},t)$ in accordance with equation (7).

Next, the transducer section (transducer) 260 applies a sigmoid non-linearity to each of the normalized energy measures to produce a transducer output. The sigmoid non-linearity is expressed as:

$$T(y) = \frac{y^{1.8}}{0.315 y^{1.65} + 6.8} \quad \text{where } y = \hat{e}_{kn\theta}(\vec{x},t) \quad (10)$$

The sigmoid non-linearity is applied to reproduce the dipper shape of contrast discrimination functions as disclosed by J. Nachmias and R. V. Sansbury in "Grating Contrast: Discrimination May Be Better Than Detection", *Vision Res.* 14 (1974) 1039–1042.

The spatially oriented filters described above have the property that, for a single filter at a single spatial position given a sine grating to which it is optimally tuned, the output as a function of number of cycles in a patch will asymptote at little more than one cycle. In contrast, foveal human sensitivity continues to improve as the number of cycles in the patch continues to increase to around 5 as disclosed by J. Hoekstra et al. in "The Influence Of The Number Of Cycles Upon The Visual Contrast Detection Threshold For Spatial Sinewave Patterns", Vision Research 14 (1974) 365–368.

To account for this effect, the visual discrimination measure 112 may include an optional pooling section (pooler) 270. For foveal inputs, the pooling section receives and averages the transducer outputs over a small "neighborhood" by convolving with a squared-shaped kernel of foveal ($d_o$) of 5 to produce a pooled output. Namely, the small neighborhood is defined as a 5-by-5 kernel (5-by-5 photoreceptor space, i.e., retinal pixels) around each point on the transducer outputs.

For stimulus eccentricities outside the fovea, the diameter $d_p$ of this kernel increases as a linear function of eccentricity, according to the expression:

$$d_p = d_0 \left( 1 + \frac{e}{k_p} \right) \quad (11)$$

where $d_0$ is the foveal diameter (5.0), e is the eccentricity in degrees (default to zero degrees) and $k_p$ is a scaling factor. This eccentricity dependent increase in pooling is needed to simulate an eccentricity dependent loss in performance, beyond that attributable to a loss in contrast sensitivity, on tasks requiring accurate relative localization of stimulus features, such as character discrimination.

After the pooling operation, each spatial position of each image is equivalent to an m-dimensional vector, where m is the number of pyramid levels times the number of orientations times the number of temporal channels. These vectors are received by the distance section (distancer) 280 where the distance between these vectors for the two input images is calculated. First, the smaller pyramid levels are upsampled to the full 512×512 size, where the result is a set of m arrays $P_i(\vec{x})$ (where i indexes from 1 to m) for each input image $\vec{x}$. From these, a distance measure D is calculated as follows:

$$D(\vec{x}_1,\vec{x}_2) = \left\{ \sum_{i=1}^{m} [P_i(\vec{x}_1) - P_i(\vec{x}_2)]^Q \right\}^{1/Q} \quad (12)$$

where $\vec{x}_1$ and $\vec{x}_2$ are the two input images, and Q is a parameter that may be set at 2. (For Q=2, this expression corresponds to the Euclidean distance between the two vectors.) The output of the distance section 280 is an image metric 290. More specifically, the output is a spatial array of distance values or JND values, which can then be used to create a JND map for a pair of corresponding input images, i.e., one from input sequence A and one from input sequence B.

Using the JND map, a plurality of other image metrics can be generated based on statistics computed from the JND maps. Generally, the values across the JND map can be combined according to a similar distance metric as described above. In practice, one of two different combinations is employed, e.g., the average across the map or the maximum. For threshold discrimination tasks, the latter is the more useful statistic, while for image quality rating tasks, the former is the more useful statistic.

Thus, the JND value output can be converted to a probability value. The actual probability values on the JND maps are calibrated in terms called JNDs, where 1 JND corresponds to a 75% probability that an observer viewing the two input images multiple times would be able to see the difference. JNDs above 1 are then calculated incrementally.

Although the visual discrimination measure 112 utilizes the spatial discrimination section 295 in the preferred embodiment, the present invention is not limited to this specific implementation. Other spatial discrimination devices or methods can be incorporated into the present invention to achieve similar results. To illustrate, the complexity of the spatial discrimination section 295 can be reduced by removing the spatially oriented filters. A more dramatic simplification replaces a substantial portion of the spatial discrimination section with a simple mean squared error calculation. For some applications, the simplifications would produce little noticeable decrement in accuracy, but the system may benefit from a significant improvement in computation speed. Similarly, the various transformations performed by the retinal sampling section 210 (or the entire retinal sampling section 210) can also be omitted or modified to minimize the complexity of the visual discrimination measure 112.

Furthermore, although the present invention describes a plurality of temporal filters, contrast pyramid transforms, and oriented filters, those skilled in the art will realize that the visual discrimination measure can be simplified by reducing the number of filters. To illustrate, multiplexers can be used to share the temporal filters 220 and 230, the contrast pyramid transform 240 and the oriented filters 250.

Furthermore, the visual discrimination measure 112 is able to generate many accurate predictions without any readjustment of its parameters. To achieve this robustness, calibration of the visual discrimination measure is performed in a two step method, illustrated in FIGS. 3 and 4. The calibration method assumes that the shape of the transducer function is independent of pyramid level or orientation channel, except for a scale factor that sets the gain as a function of frequency band.

Figure 3:
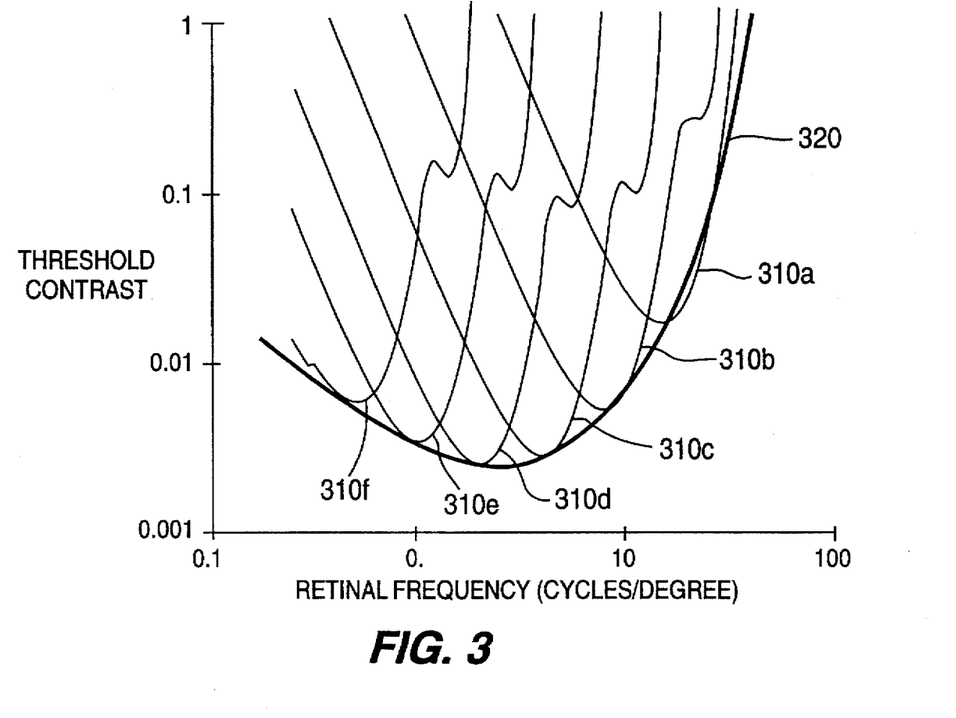
FIG. 3 illustrates a graph showing sensitivity adjustment of pyramid levels to achieve fit to a contrast sensitivity function.

FIG. 3 illustrates the first calibration step which is based on a fit to the spatial contrast sensitivity function, as measured by O. H. Schade in "Electro-Optical Characteristics Of Television Systems", RCA Review 9 (1948) 5–37. In a contrast sensitivity measurement, the contrast of a grating pattern of a fixed spatial frequency is adjusted until the grating is just detectable. The threshold contrast measurement is repeated at a number of different spatial frequencies, so that the results can be plotted as a function of spatial frequency. Thus, each of the U-shaped curves 310a–310f represents the spatial frequency response of one of the pyramid level as discussed above. The bold curve 320 represents the sensitivity data or contrast sensitivity function of the eye of a human being.

More specifically, for each spatial frequency, the contrast of the grating is adjusted until the maximum response from the oriented filter stage for that pyramid level is exactly 1. The results of such computation for each pyramid level are shown by the set of thinner lined curves 310a–310f in FIG. 3. These curves are shifted up and down by changing the value of the contrast normalization term $H_{kn}$ for each pyramid level. Thus, the first step of the calibration process adjusts the values of $H_{kn}$ to shift the curves up or down until their combined envelope produces the best possible fit to the overall contrast sensitivity function. The fit shown in FIG. 3 is the result of such an optimization method as applied to the spatial version of the vision model. For the spatiotemporal version, the data of F. L. van Nes et al., "Spatiotemporal Modulation Transfer In The Human Eye", J. Opt. Soc. Am. 57, 1082–1088 (1967) and J. J. Koenderink et al., "Spatiotemporal Contrast Detection Threshold Surface Is Bimodal", Optics Letters 4, 32–34 (1979) was used in an analogous procedure.

Figure 4:
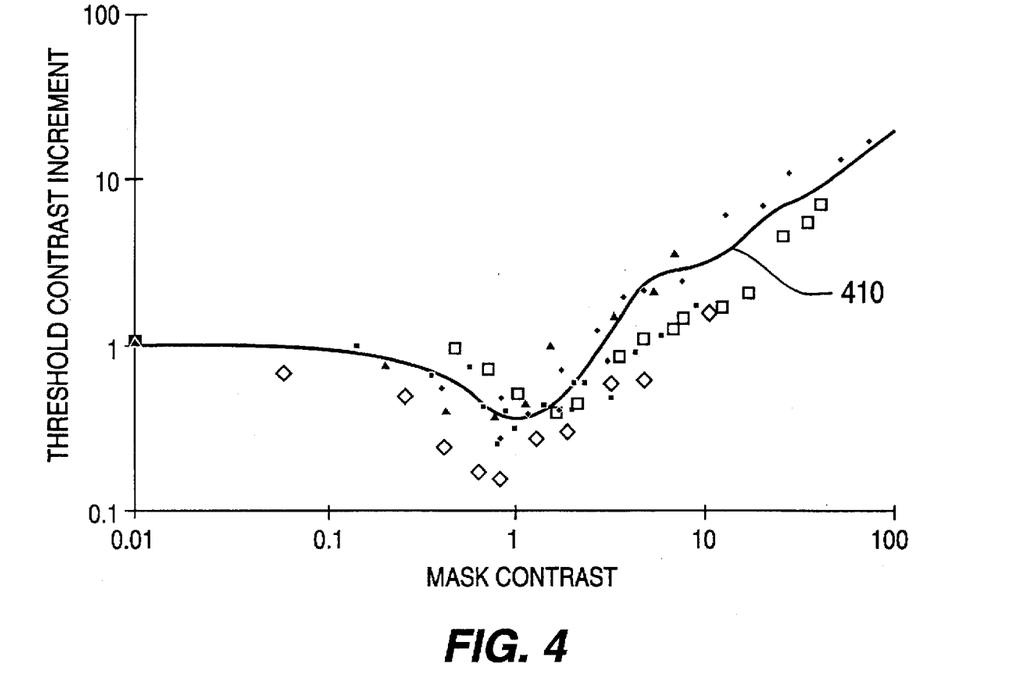
FIG. 4 illustrates a graph showing predictions of the visual discrimination measure on contrast discrimination data of A. Bradley and I. Ohzawa in "A Comparison Of Contrast Detection And Discrimination", *Vision Res.* 26 (1986) 991–997, showing fit of transducer parameters.

The second step of the calibration method is based on the contrast discrimination results of A. Bradley and I. Ohzawa in "A Comparison Of Contrast Detection And Discrimination", Vision Res. 26 (1986) 991–997. FIG. 4 illustrates a contrast discrimination calculation, where a just detectable change in grating contrast is measured as a function of the starting contrast of that grating. The contrast discrimination data plotted in FIG. 4 represent different spatial frequencies. Both the threshold contrast change (ordinate values) and starting contrast (abscissa values) have been normalized by the contrast detection threshold for that grating. The resulting curves for different spatial frequencies (as indicated by the different symbol types) overlap to produce a bold curve 410, thereby indicating that a single transducer section can be used for all pyramid levels, after the normalization adjustments described in the first calibration step. Thus, only a single set of transducer parameters needs to be adjusted, thereby simplifying and enhancing the robustness of the fitting method.

Figure 5:
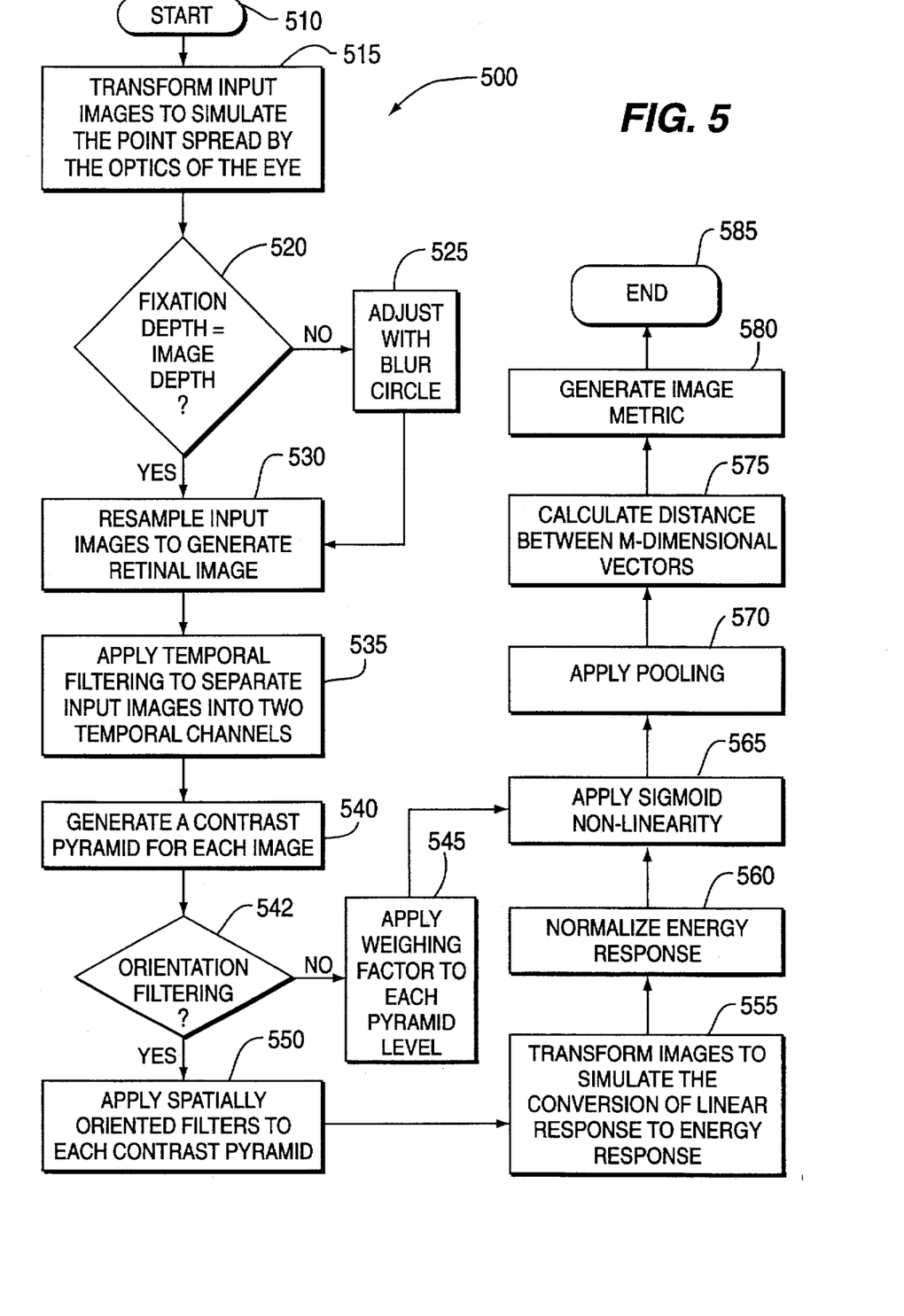
FIG. 5 illustrates a flowchart of a method for assessing the visibility of differences between two input image sequences.

FIG. 5 illustrates a method 500 for assessing the visibility of differences between two input image sequences. Method 500 begins at step 510 and proceeds to step 515 where the input image sequences are received and transformed prior to sampling. The input images are convolved with the function of equation (1) for approximating the point spread by the optics of the eye.

In step 520, the method determines whether the fixation depth is equal to the image depth. If the decision is affirmatively answered, then method 500 proceeds to step 530 where the input images are resampled to generate retinal images. If the decision is negatively answered, method 500 proceeds to step 525 where a "blur circle" is calculated and convolved with the input images to account for changes in effective image resolution with changes in the difference between image depth and fixation depth.

In step 530, the sampling process attempts to simulate the sampling process of the human eye. Effectively, each input image is sampled at a density of 120 pixels per degree of visual angle to generate a "retinal image" of 512×512 pixels for "foveal viewing". For "non-foveal viewing", step 530 samples the input image at a density in accordance with equation 2.

In step 535, temporal filtering is applied to the retinal images to separate each input image into two temporal channels, a sustained channel and a transient channel. The sustained channel contains a low-pass temporal response while the transient channel contains a bandpass temporal response of the input image sequence. The functions of the two temporal filters are expressed in equations (3) and (4).

In step 540, a contrast pyramid is generated by decomposing each image generated from step 535. Each contrast pyramid contains seven frequency channels or pyramid levels.

In step 542, method 500 determines whether orientation filtering is selected. If the query is negatively answered, method 500 proceeds to step 545. If the query at step 542 is affirmatively answered, method 500 proceeds to step 550 where orientation filtering is applied.

In step 545, a weighting factor is then applied to each pyramid level to account for the contrast sensitivity function of the human eye. The weighting factors are calculated by changing the value of the contrast normalization term $H_{kn}$ for each pyramid level and temporal channel. The adjustment of the values of $H_{kn}$ is used in conjunction with FIG. 3 to shift the curves 310a–310f up or down until their combined envelope produces the best possible fit to the overall contrast sensitivity function. Method 500 then proceeds to step 565 where a sigmoid non-linearity is applied to the normalized energy response in accordance with equation (10).

In step 550, spatially oriented filters are applied to each contrast pyramid where the output images are then transformed in step 555 in accordance with equation (8) to simulate the conversion of linear response among simple cells to an energy response among complex cells in the mammalian visual cortex.

In step 560, the energy response is then normalized in accordance with equation (9) and a sigmoid non-linearity is applied to the normalized energy response in step 565 in accordance with equation (10).

In step 570, a pooling operation is applied to the outputs from step 565. The pooling operation averages the energy response over a small neighborhood by convolving with a disc-shaped kernel of a certain diameter size. For stimulus eccentricities inside of the fovea, the "foveal" diameter is set at 5. For stimulus eccentricities outside of the fovea, the diameter $d_p$ is calculated in accordance with equation (11). After the pooling operation, each spatial position of each image is equivalent to an m-dimensional vector.

In step 575, the distance between these vectors for two corresponding input images is calculated. Smaller pyramid levels are upsampled to the full 512×512 size and the distance is calculated in accordance with equation (12) to produce a spatial array of distance values.

In step 580, spatial array of distance values can be used to generate various image metrics such as a JND map or a probability prediction. Method 500 then ends in step 585.

Figure 7:
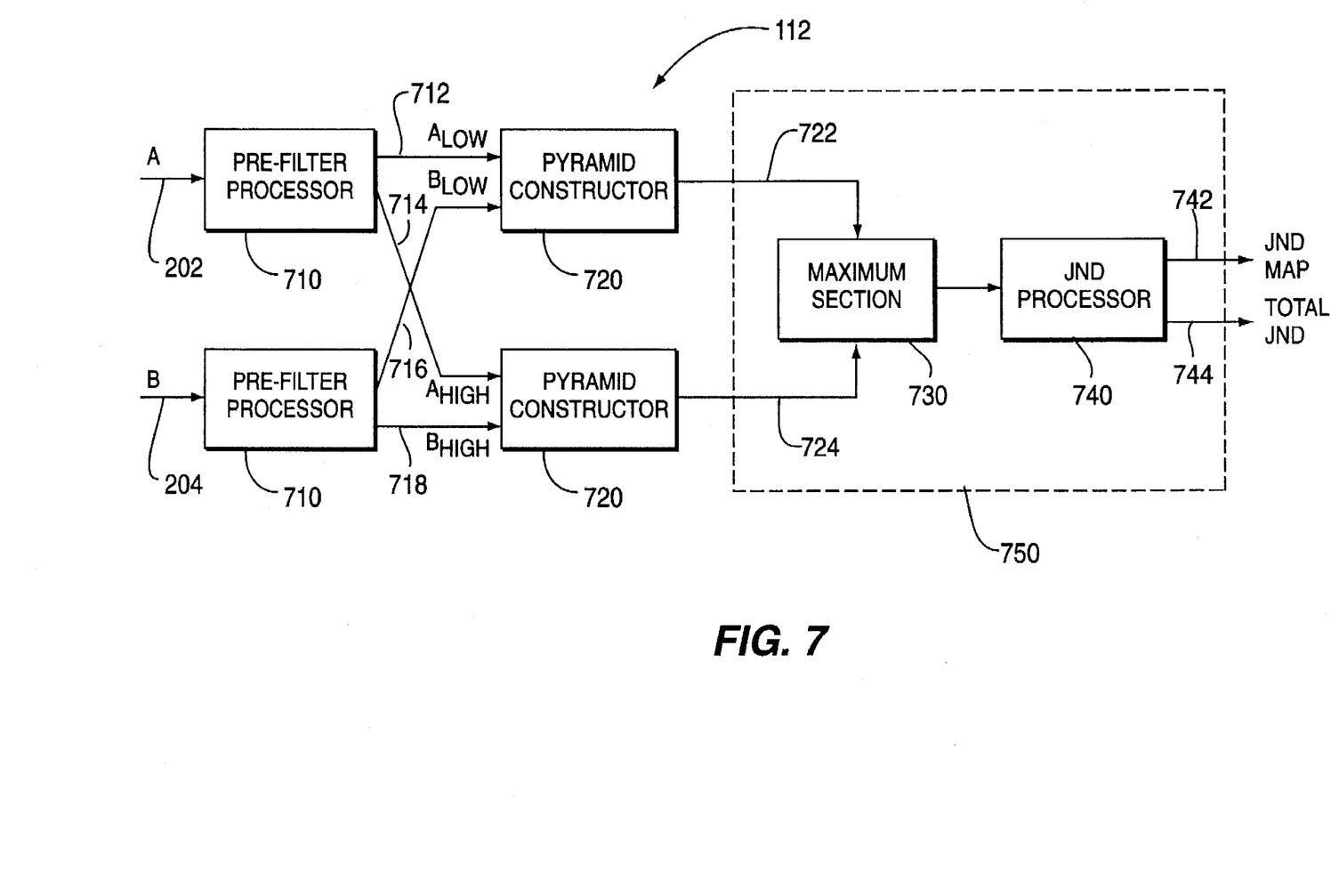
FIG. 7 illustrates a block diagram of a hardware implementation of the visual discrimination measure.

FIG. 7 illustrates a hardware implementation of the visual discrimination measure 112, which incorporates a pair of pre-filter processors 710, a pair of pyramid constructors 720, a maximum section 730 and a JND processor 740. Each pre-filter processor 710 receives a separate image sequence "A" 202 or "B" 204. The pre-filter processors 710 perform temporal filtering on the input image sequences to produce a pair of low-pass (sustained channel) temporal responses, $A_{LOW}$ on path 712 and $B_{LOW}$ on path 716 and a pair of bandpass (transient channel) temporal responses, $A_{HIGH}$ on path 714 and $B_{HIGH}$ on path 718.

The present hardware implementation of the visual discrimination measure 112 may not incorporate all of the functions performed by the visual discrimination measure as described above. Some functions are optional and/or are better addressed through the appropriate software application. For example, the functions performed by the retinal sampling section 210 as described above are implemented by a software application. As such, the image sequences A and B as illustrated in FIG. 7 are retinal sampled image sequences, under viewing condition such that each pixel subtends a visual angle of 0.0068 degrees. The pre-filter processor 710 is further described below with reference to FIG. 8.

The pyramid constructors 720 receive the temporal responses and generate the contrast pyramids as described above. Namely, the pyramid constructor generates and manipulates the Gaussian and Laplacian pyramids. The pyramid constructor 720 is further described below with reference to FIG. 9.

The outputs from the pyramid constructors on paths 722 and 724 (from low and high temporal channels respectively) are received and evaluated by the maximum section 730, which forwards the maximum (maximum over all images for each given pixel) of the outputs to the JND processor 740. Although the maximum section 730 is illustrated as a separate component, it can be implemented within the JND processor or by software. Furthermore, the maximum section 730 and JND processor 740 can be collectively referred to as a contrast pyramid processor 750.

The JND processor 740 performs an inverse pyramid operation and generates an image metric such as a JND map 742 and/or a total JND value 744. The JND processor is further described below with reference to FIG. 10.

Figure 8:
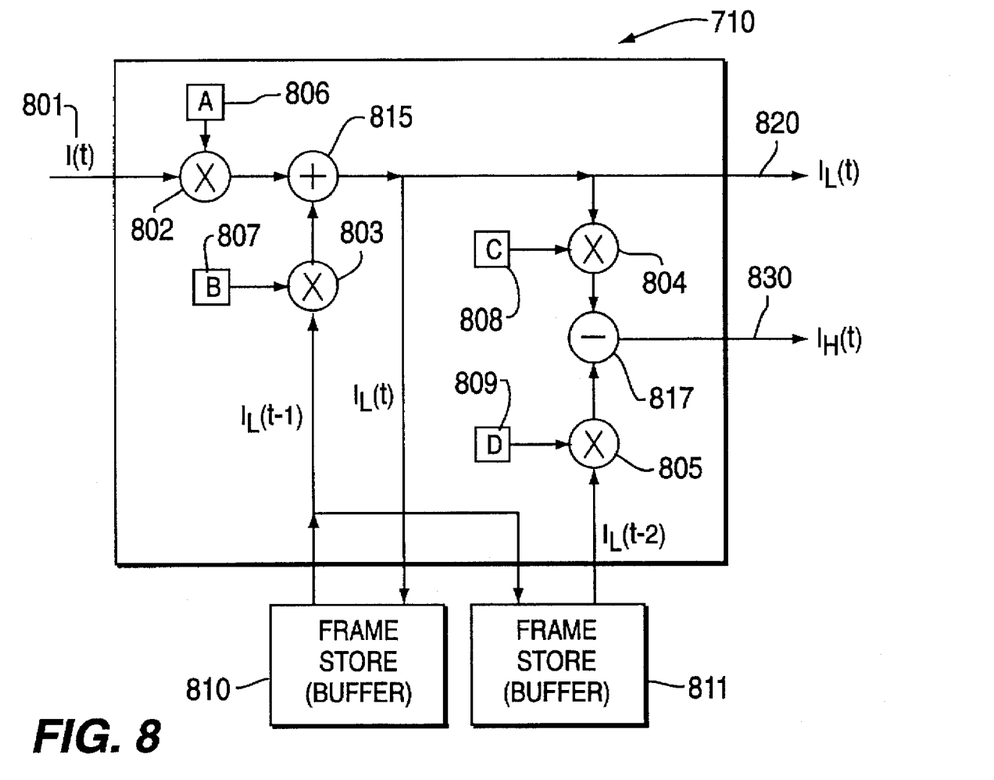
FIG. 8 illustrates a block diagram of the pre-filter processor.

FIG. 8 illustrates a block diagram of the pre-filter processor 710 which incorporates a plurality of multipliers 802–805, a plurality of constants 806–809, an adder 815, a subtractor 817 and a plurality of frame stores (buffers) 810–811. The pre-filter processor 710 receives an input signal I(t) on path 801 and produces a temporal low-pass response $I_L(t)$ on path 820 and a temporal high-pass response $I_H(t)$ on path 830.

The temporal low-pass response $I_L(t)$ is formed by adding two products, via adder 815. The first product is obtained by multiplying the I(t) signal with constant A 806 via multiplier 802. The second product is obtained by multiplying the $I_L(t-1)$ signal stored in frame store 810 with constant B 807 via multiplier 803. Namely, the temporal low-pass response $I_L(t)$ is expressed as:

$$I_L(t)=A*I(t)+B*I_L(t-1) \qquad (13)$$

where A and B are constants with the approximate values of $1-e^{-\lambda \Delta t}$ and $e^{-\lambda \Delta t}$ respectively, $\lambda$ is defined in equation (3) above, $\Delta t$ is the video interframe interval in seconds, and the $I_L(t-1)$ signal is low-pass response of a previous image frame. The sum between successive image frames produces a temporal averaging effect, thereby generating the temporal low-pass response $I_L(t)$.

In contrast, the temporal high-pass response $I_H(t)$ is formed by taking the difference, via subtractor 817, between two products. The first product is obtained by multiplying the I(t) signal with constant C 808, via multiplier 804. The second product is obtained by multiplying the $I_L(t-2)$ signal stored in frame store 811 with constant D 809 via multiplier 805. Namely, the temporal high-pass response $I_H(t)$ is expressed as:

$$I_H(t)=C*I_L(t)-D*I_L(t-2). \qquad (14)$$

where C and D are constants, where both values default to the value of "1" and the $I_L(t-2)$ signal is a previous low pass response with respect to the signal stored in frame store 810. As described above, the bandpass filter 230 can be implemented by taking a difference of two low-pass filters.

In the preferred embodiment, a separate pre-filter processor 710 is employed to process each image sequence A 202 and B 204 as illustrated in FIG. 7. However, those skilled in the art will realize that the present invention can be implemented with a single pre-filter processor through the use of a multiplexer.

Figure 9:
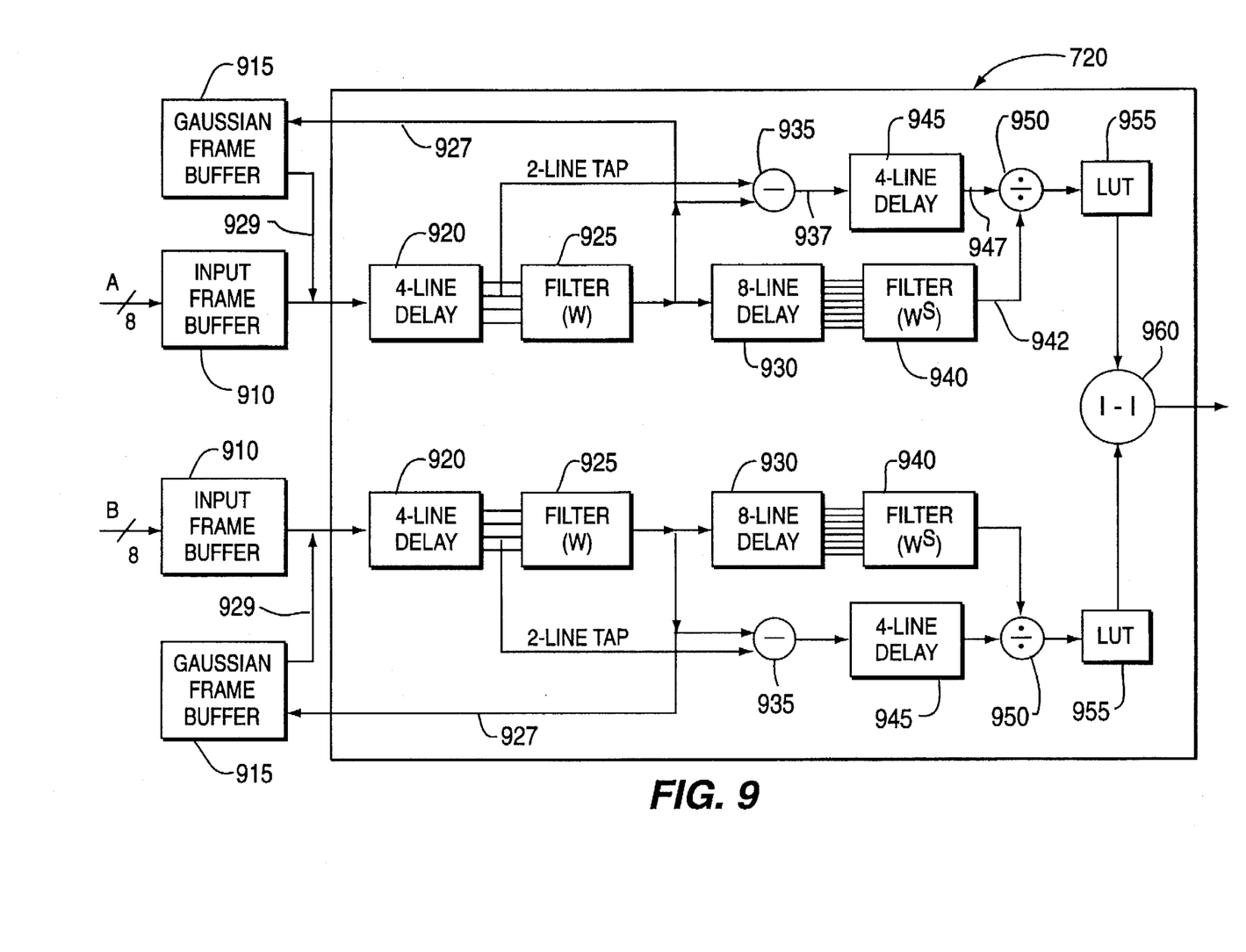
FIG. 9 illustrates a block diagram of the pyramid constructor.

FIG. 9 illustrates a block diagram of the pyramid constructor 720 which comprises a plurality of input frame buffers 910, a plurality of Gaussian frame buffers 915, a plurality of 4-line delays 920 and 945, a plurality of 8-line delays 930, a plurality of filters 925 and 940, a plurality of look-up tables 955 and a plurality of subtractors 935 and 960 and dividers 950.

The pyramid constructor 720 receives 8-bit input images (8 bits per pixel) from the two temporal channels, where they are processed in parallel as shown in FIG. 9. Since the hardware implementations are identical for both channels, the pyramid constructor 720 is described below with reference to only one channel (e.g., the channel for processing image sequence A).

The input images are initially stored in input frame buffer 910 for buffering the rate at which images are sent to the pyramid constructor 720 and the rate at which the pyramid constructor reads the images. However, those skilled in the art will realize that this input frame buffer can be implemented elsewhere, e.g., within the pre-filter processor, before the visual discrimination measure 112 or within the signal receiving section 130.

A 4-line delay 920 is disposed between input frame buffer 910 and a 5×5 filter 925. The 4-line delay 920 produces five vertical pixels which serve as the required data for the 5×5 filter 925 and also provides adjustable pipeline delays needed to align data samples. The 5×5 filter 925 is implemented using a standard low-pass Gaussian filter to produce a low-pass output on path 927, which, in turn, is subtracted from the original input via the 2-line tap and subtractor 935 to produce a bandpass (or high-pass) output on path 937. The bandpass output on path 937 is processed by another 4-line delay 945 to produce a bandpass (or high-pass) output on path 947.

An 8-line delay 930 and a 9×9 filter 940 ("spread-tap" filter) is applied to the low-pass output of filter 925 to produce the next lower band frequency response, i.e., a lower resolution image. The filter 940 can be implemented by expanding the same 5×5 filter. Namely, a 5×5 filter is expanded to a 9×9 filter by inserting zero-value taps between those of the original filter.

Next, the bandpass output from the 4-line delay 945 on path 947 is divided by the low-pass output on path 942 from filter 940 to normalize the bandpass (or high-pass) output, i.e., the contrast of the bandpass result is normalized. A non-linear function is then applied through a look-up table (LUT) 955 to the normalized bandpass output, thereby providing one implementation of the normalization functions as discussed in equation (10) with substitution from equation (7) or equation (9) above. For each temporal channel, an absolute difference operator 960 is applied to the outputs from the two image sequences. These outputs are passed to the maximum section 730 which performs part of the operation of equation (12) in which Q is allowed to approach infinity.

Furthermore, the low-pass output of filter 925 is stored in the frame buffer 915 via path 927. The Gaussian pyramid represents an image as a sequence of low-pass filtered and subsampled images. Since the initial first level of the Gaussian pyramid is taken from the input buffer 910, each lower resolution representation of this input image is stored in frame buffer 915 so that the operation implemented by the pyramid constructor 720 can be applied to the stored subsampled image, via path 929. As such, the pyramid constructor 720 repeatedly generates subsequent levels of the Guassian pyramid. The number of iterations can be controlled by a predefined value or by a controller (not shown). Furthermore, those skilled in the art will realize that depending on the speed requirement of a particular application, it is possible to simplify the present implementation through the use of multiplexers (not shown) rather than having duplicate hardware as shown in FIG. 9.

Figure 10:
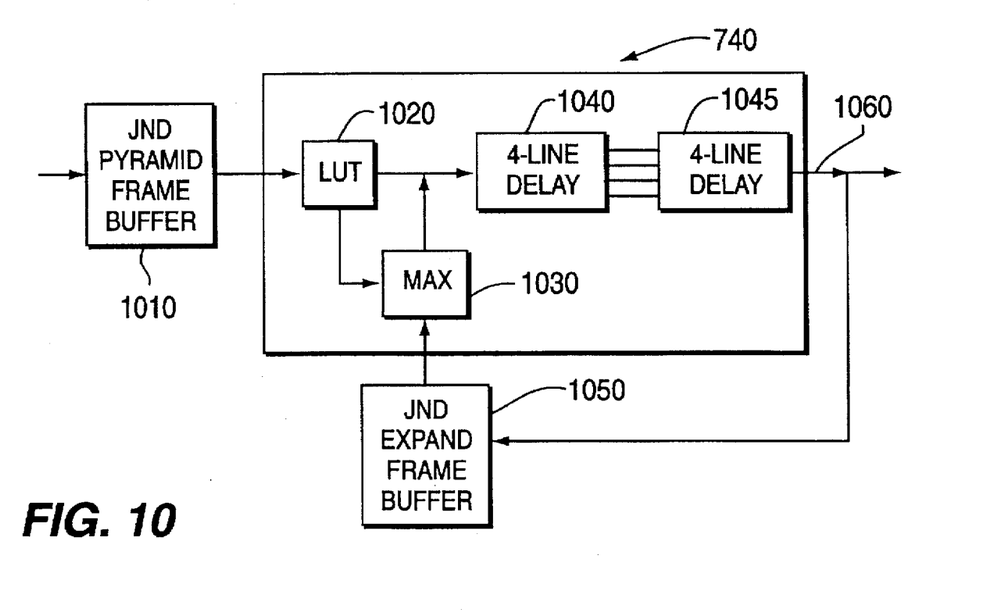
FIG. 10 illustrates a block diagram of the JND processor.

FIG. 10 illustrates a block diagram of the JND processor 740 which performs an inverse pyramid operation to expand the input images back to their full resolution. The JND processor comprises a JND pyramid frame buffer 1010, an optional look-up table 1020, a maximum section 1030, a 4-line delay 1040, a filter 1045 and a JND expand frame buffer 1050.

The JND pyramid frame buffer 1010 stores the output from maximum section 730 which comprises a pyramid with a sequence of levels. The frame buffer 1010 is of sufficient size to store the entire pyramid so that the JND processor can reverse read the pyramid by reading the lowest resolution image first.

The image is expanded by applying a weighting function to each level of the pyramid using an optional look-up table 1020, a 4-line delay 1040 and a filter 1045. The optional look-up table 1020 permits scaling of the different spatial frequency of the JND map to meet the requirements of different applications. The expanded image is produced on path 1060. Effectively, the filter 1045 serves to interpolate the image by inserting zeros between every other pixel and line. The expanded image is stored in the JND expand frame buffer 1050, where the maximum (maximum over all images for each given pixel) of the expanded image and the next resolution image from the JND pyramid frame buffer is again interpolated. This process is repeated until the final resolution is reached (the original resolution of the input image).

There has thus been shown and described a novel apparatus for assessing the visibility of differences between two input image sequences. Many changes, modifications, variations and other uses and applications of the subject invention will, however, become apparent to those skilled in the art after considering this specification and the accompanying drawings which disclose the embodiments thereof. All such changes, modifications, variations and other uses and applications which do not depart from the spirit and scope of the invention are deemed to be covered by the invention, which is to be limited only by the claims which follow.

What is claimed is:

1. Apparatus for assessing visibility of differences between a first input image sequence and a second input image sequence, where each image sequence having a plurality of images, said apparatus comprising:

a pre-filter processor for filtering the first input image sequence into a first low-pass temporal response and a first high-pass temporal response and filtering the second input image sequence into a second low-pass temporal response and a second high-pass temporal response;

a pyramid constructor, coupled to said pre-filter processor, for generating a first contrast pyramid, having a plurality of levels, for each image of said first and second low-pass temporal responses and generating a second contrast pyramid, having a plurality of levels, for each image of said first and second high-pass temporal responses; and a contrast pyramid processor, coupled to said pyramid constructor, for generating an image metric from said contrast pyramids.

2. The apparatus of claim 1, wherein said pre-filter processor comprises a first pre-filter processor for filtering the first input image sequence and a second pre-filter processor for filtering the second input image sequence; and wherein said pyramid constructor comprises a first pyramid constructor, coupled to both said first and second pre-filter processors, for generating said contrast pyramid for each image of said first and second low-pass temporal responses and a second pyramid constructor, coupled to both said first and second pre-filter processors, for generating said contrast pyramid for each image of said first and second high-pass temporal responses.

3. The apparatus of claim 2, wherein said contrast pyramid processor comprises:

a first maximum section for comparing said contrast pyramids from said pyramid constructors to determine a maximum contrast pyramid.

4. The apparatus of claim 3, wherein said contrast pyramid processor further comprises:

a first buffer, coupled to said first maximum section, for storing said maximum contrast pyramid having a plurality of levels;

a delay, coupled to said first buffer, for applying a delay to each of said level of said maximum contrast pyramid;

a filter, coupled to said delay, for expanding a level of said maximum contrast pyramid to a resolution of a next level;

a second buffer, coupled to said filter, for storing said expanded level of said maximum contrast pyramid; and a second maximum section, coupled to said first and second buffers, for comparing a next level of said maximum contrast pyramid stored in said first buffer and said expanded level stored in said second buffer to determine a maximum level.

5. The apparatus of claim 4, wherein said contrast pyramid processor further comprises:

a look-up table, coupled between said first buffer and said delay, for applying a weighting function to each level of said maximum contrast pyramid.

6. The apparatus of claim 2, wherein each of said pre-filter processors comprises:

a first buffer for storing a low-pass response of a previous frame with respect to a current frame of the input image sequence;

a second buffer, coupled to said first buffer, for storing a low-pass response of a previous frame with respect to said frame stored in said first buffer;

an adder, coupled to said first buffer, for adding a current frame from the input image sequence with said low-pass response stored in said first buffer to produce a temporal low-pass response; and a subtractor, coupled to said second buffer, for taking a difference between said temporal low-pass response and said low-pass response stored in said second buffer to produce a temporal high-pass response.

7. The apparatus of claim 6, wherein said temporal low-pass response is expressed as:

$$I_L(t) = A*IL(t) + B*I_L(t-1)$$

and wherein said temporal high-pass response is expressed as:

$$I_H(t) = C*I_L(t) - D*I_L(t-2).$$

where A, B, C and D are constants, $I_L(t)$ represents said temporal low-pass response, $I_H(t)$ represents said temporal high-pass response, I(t) represents one of the input image sequence, $I_L(t-1)$ represents said low-pass response stored within said first buffer and $I_L(t-2)$ represents said low-pass response stored within said second buffer.

8. The apparatus of claim 2, wherein each of said pyramid constructors comprises:

two channels, where each of said channel receives a separate temporal response from one of said pre-filter processors.

9. The apparatus of claim 8, wherein each of said channel comprises:

a first delay for applying a delay to said temporal response from said pre-filter processor;

a first filter, coupled to said delay, for producing a first low-pass output;

a second delay, coupled to said first filter, for applying a delay to said first low-pass output;

a second filter, coupled to said second delay, for producing a second low-pass output;

a first subtractor, coupled to said first filter and first delay, for taking a difference between said delayed temporal response of said first delay and said first low-pass output to produce a high-pass output;

a third delay, coupled to said first subtractor, for applying a delay to said high-pass output;

a divider, coupled to said third delay and said second filter, for dividing said delayed high-pass output by said second low-pass output to produce a normalized high-pass output;

a look-up table, coupled to said divider, for applying a weighting function to said normalized high-pass output; and a buffer, coupled to said first filter, for storing said first low-pass output.

10. The apparatus of claim 9, wherein said first filter is a Guassian filter and said second filter is a spread-tap filter.

11. The apparatus of claim 9, wherein said first delay is a four-line delay, said second delay is a eight-line delay and said third delay is a four-line delay.

12. The apparatus of claim 9, wherein said first low-pass output stored in said buffer is applied to said first delay to generate subsequent levels of a Guassian pyramid.

13. The apparatus of claim 9, wherein each of said pyramid constructor further comprises a second subtractor, coupled to said look-up tables from both channels, for taking a difference between said weighted normalized high-pass outputs to produce said contrast pyramid.

14. Apparatus for assessing visibility of differences between a first input image sequence and a second input image sequence, said apparatus comprising:

a first pre-filter processor for filtering the first input image sequence into a first low-pass temporal response and a first high-pass temporal response;

a second pre-filter processor for filtering the second input image sequence into a second low-pass temporal response and a second high-pass temporal response, wherein each of said pre-filter processors comprises a first buffer for storing a low-pass response of a previous frame with respect to a current frame of the input image sequence, a second buffer, coupled to said first buffer, for storing a low-pass response of a previous frame with respect to said frame stored in said first buffer, an adder, coupled to said first buffer, for adding a current frame from the input image sequence with said low-pass response stored in said first buffer to produce a temporal low-pass response, and a subtractor, coupled to said second buffer, for taking a difference between said temporal low-pass response and said low-pass response stored in said second buffer to produce a temporal high-pass response;

a first pyramid constructor, coupled to both said first and second pre-filter processors, for generating a contrast pyramid, having a plurality of levels, for each frame of said first and second low-pass temporal responses;

a second pyramid constructor, coupled to both said first and second pre-filter processors, for generating a contrast pyramid, having a plurality of levels, for each frame of said first and second high-pass temporal responses, wherein each of said pyramid constructors comprises two channels, where each of said channel receives a separate temporal response from one of said pre-filter processors; and a processor, coupled to said pyramid constructors, for generating an image metric from said contrast pyramids.

* * * * *